(12) United States Patent
Mazziotti

(10) Patent No.: US 7,594,857 B2
(45) Date of Patent: Sep. 29, 2009

(54) DOUBLE CARDAN JOINT

(76) Inventor: Philip Mazziotti, 2826 Falmouth Rd., Toledo, OH (US) 43615

( * ) Notice: Subject to any disclaimer, the term of this patent is extended or adjusted under 35 U.S.C. 154(b) by 313 days.

(21) Appl. No.: 11/800,111

(22) Filed: May 7, 2007

(65) Prior Publication Data

US 2008/0280689 A1    Nov. 13, 2008

(51) Int. Cl.
F16D 3/27 (2006.01)
(52) U.S. Cl. .................... 464/118; 464/125
(58) Field of Classification Search ............ 464/50, 464/117, 118, 125, 905
See application file for complete search history.

(56) References Cited

U.S. PATENT DOCUMENTS

| | | |
|---|---|---|
| 1,333,988 A | 3/1920 | Mattingly |
| 2,042,513 A | 6/1936 | Daniell |
| 2,067,286 A | 1/1937 | Pearce |
| 3,159,013 A | 12/1964 | Mazziotti |
| 3,301,008 A | 1/1967 | Beinke |
| 3,747,368 A | 7/1973 | Morin |
| 4,116,019 A | 9/1978 | Welschof |
| 4,490,125 A | 12/1984 | Konrad et al. |
| 5,425,676 A | 6/1995 | Cornay |
| 6,139,437 A * | 10/2000 | Thompson ............... 464/117 |
| 6,203,438 B1 | 3/2001 | Kirson |
| 6,626,764 B1 * | 9/2003 | Cornay ................... 464/117 |
| 6,692,363 B1 | 2/2004 | Heutschi et al. |
| 6,863,615 B2 | 3/2005 | Herchenbach et al. |
| 7,037,202 B2 * | 5/2006 | Bigelow et al. ............ 464/50 |

FOREIGN PATENT DOCUMENTS

DE    24 53 084 A1 *  5/1976  ............. 464/125

* cited by examiner

*Primary Examiner*—Greg Binda
(74) *Attorney, Agent, or Firm*—David C. Purdue; John C. Purdue

(57) ABSTRACT

A compact heavy duty double universal joint is disclosed. The joint comprises a torque coupler having an interior bore and a pair of bosses adjacent each end, a pair of collars pivotally connect to the bosses, a pair of yokes pivotally connect to the collars and a centering rod assembly in the bore of the coupler. The centering rod assembly is operable, when the operating angle of the joint is not zero, to position the torque coupler so that it splits the operating angle of the universal joint.

5 Claims, 6 Drawing Sheets

DOUBLE CARDAN JOINT

BACKGROUND OF THE INVENTION (1) Field of the Invention

The present invention relates generally to torque transmitting joints and, specifically, to double Cardan joints.

(2) Description of Related Art Including Information Disclosed under 37 CFR 1.97 and 37 CFR 1.98

Torque transmitting joints are used in a wide variety of applications and especially in vehicle applications. Such joints generally transmit torque from an input shaft to an output shaft. Universal ("U") joints or Cardan joints are in widespread use in heavy machinery applications and in automobiles and trucks and they accommodate changes, in service, in the angle between the input shaft and the output shaft, referred to hereinafter as the operating angle. Double Cardan joints include two universal joints so arranged that each accommodates one half of the operating angle. Double Cardan joints split the operating angle into two separate angles that are half of the operating angle. Double Cardan joints come closer to achieving constant velocity torque transmission than do single Cardan universal joints. However, in heavy duty applications, for example, double Cardan joints can become quite bulky and heavy. Such joints, with heavy parts rotating at high speeds at substantial distances from the axes of the shafts, have high inertia and are susceptible to undesired and excessive vibration.

BRIEF SUMMARY OF THE INVENTION

The present invention is an improved double Cardan joint for transmitting torque, for example, from a drive shaft of a vehicle to a driven shaft of the vehicle. The joint, which exhibits excellent stability, low vibration and low inertia even when it is sized for heavy duty applications, comprises a cylindrical torque coupler, first and second yokes having facing open ends, first and second collars, first trunion pins by which the first collar is pinned to the first yoke, and second trunion pins by which the second collar is pinned to the second yoke. The cylindrical torque coupler has a central bore in which there is an assembly of two centering rods, each of which has a head outside of the bore which is seated in one of the yokes. One of the two rods has a socket inside the bore, while the other has a head inside the bore which is seated in the socket of the other. The first yoke has opposed sidewalls operably connected to transmit torque into the joint from a driving shaft, while the second yoke has opposed sidewalls operably connected to receive torque from the joint for transmission through the yoke to a driven shaft. The first and second collars of the joint are pivotally supported on the torque coupler and the collars are, in turn, pivotally connected to the yokes so that, when a driving shaft associated with the first yoke is rotated, torque is transmitted through the Cardan joint to a driven shaft associated with the second yoke. The joint can accommodate an operating angle and the torque coupler is positioned by the centering apparatus so that it splits the operating angle.

Accordingly, it is an object of the present invention to provide an improved double Cardan, universal joint.

It is a further object to provide such a joint with improved means for splitting the operating angle between a driving shaft and a driven shaft.

It is still another object of this invention to provide a compact but heavy duty double cardan joint.

These and other objects and advantages will be apparent from the description which follows, reference being made to the attached drawings.

DETAILED DESCRIPTION OF THE INVENTION

Figure 1:
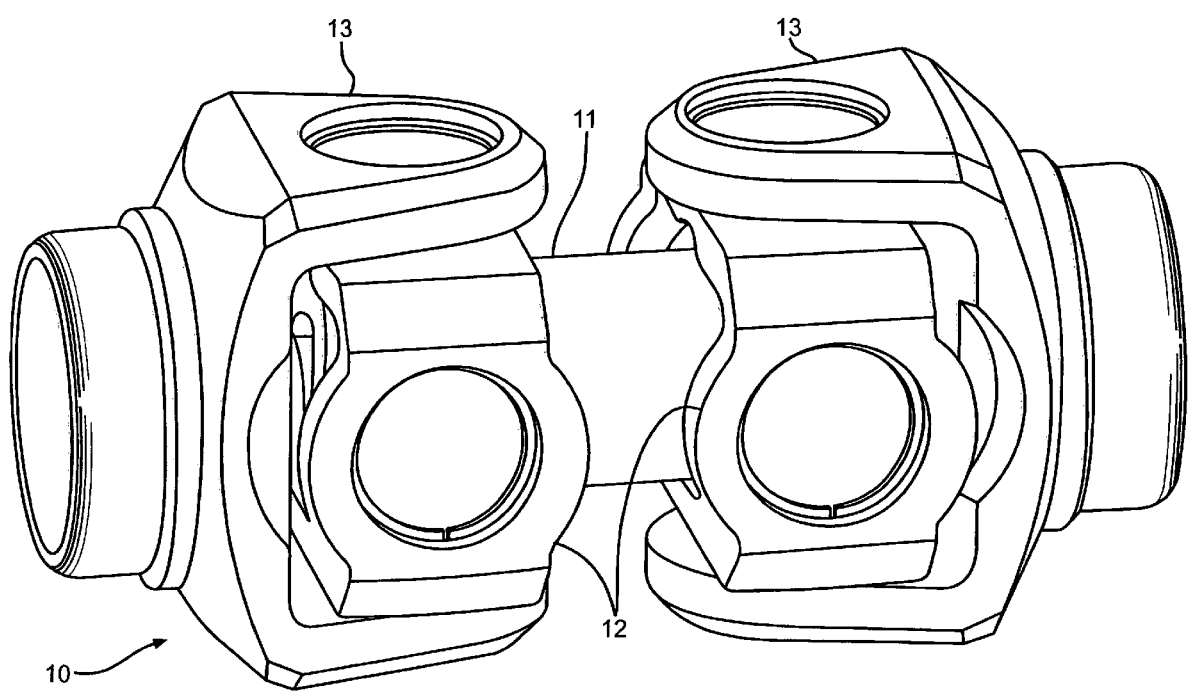
FIG. 1 is a perspective view of a double universal joint according to the invention.
Figure 2:
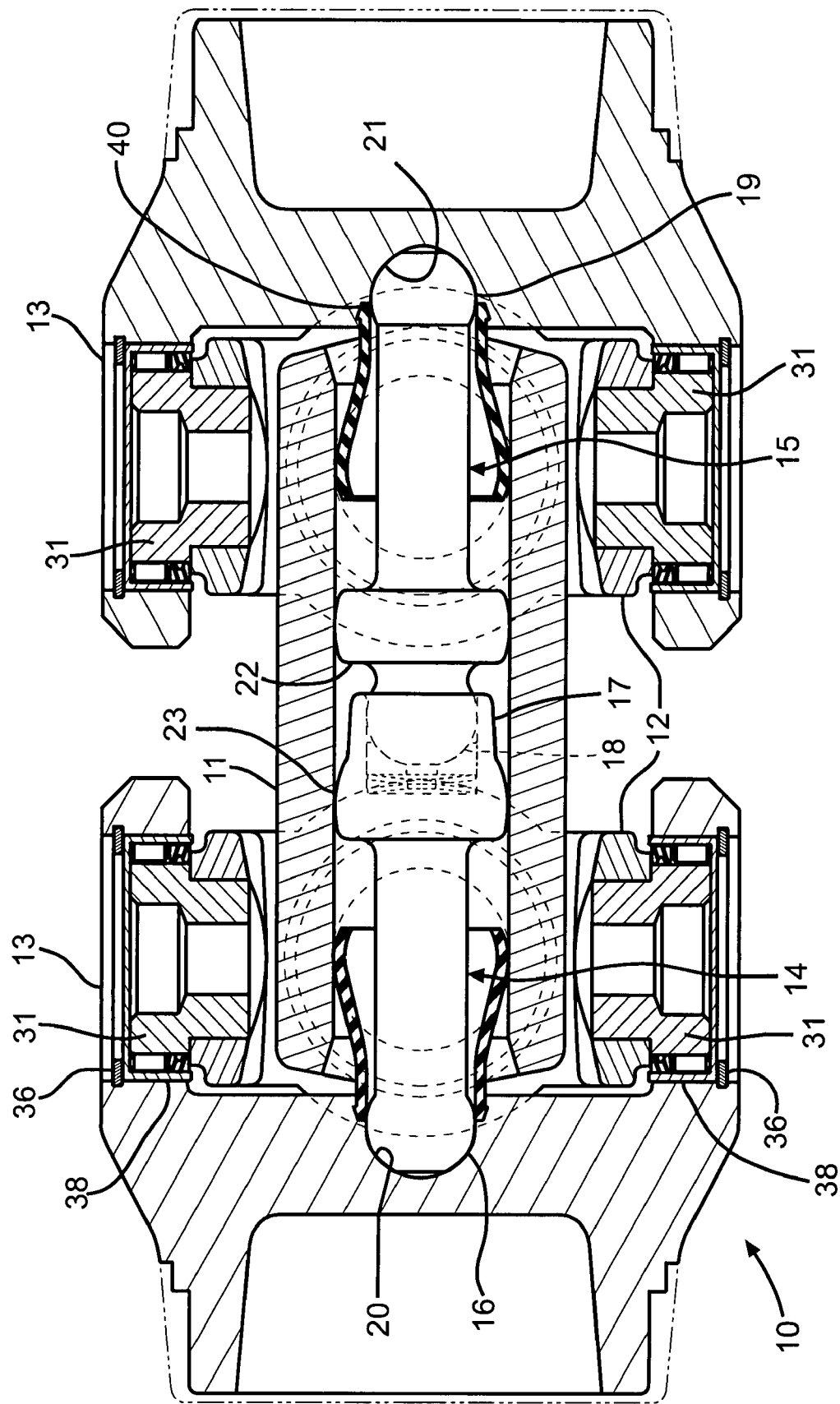
FIG. 2 is a view in vertical section showing the universal joint of FIG. 1 when the two shafts it serves are axially aligned.
Figure 3:
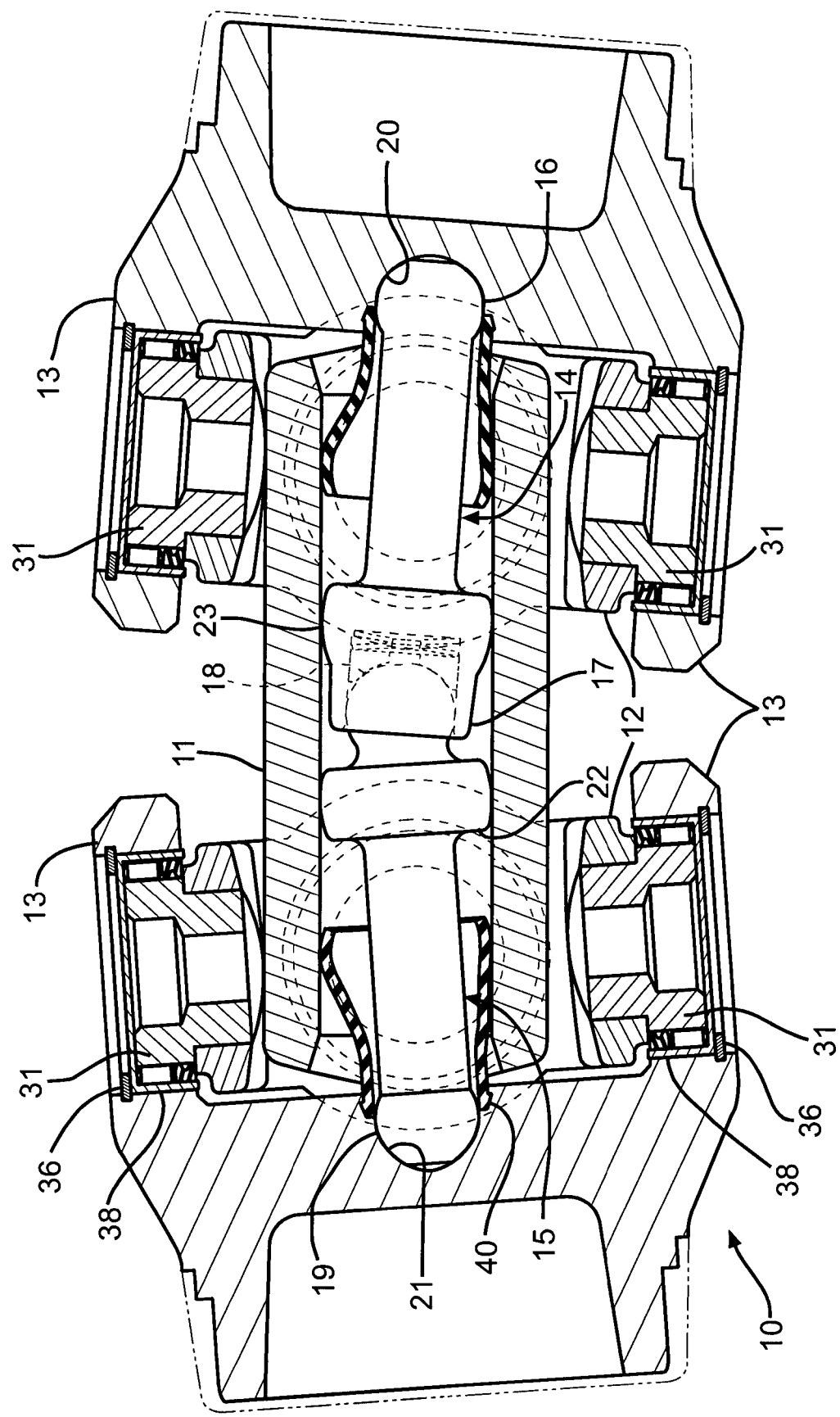
FIG. 3 is a vertical sectional view similar to FIG. 2, but showing the universal joint when the two shafts it serves are not axially aligned.

Referring, now, in more detail to the drawings, one embodiment of the instant invention is a double Cardan type universal joint indicated generally at 10 in FIGS. 1 through 3. The joint 10 comprises a torque coupler 11 with a collar 12 and an associated yoke 13 adjacent to each end of the coupler 11. Torque input, for example, from a driving shaft (not shown), is input to one of the yokes 13 and transmitted through the associated collar 12 to the torque coupler 11 and through the torque coupler 11 torque is transmitted to the other collar 12 and through the associated yoke 13, for example, to a driven shaft (not shown).

The torque coupler 11, as shown in FIGS. 2 and 3, has a hollow interior through which headed centering rods 14 and 15 extend. The rod 14 has a head 16 at one end, and a socket 17 at its other end, while the rod 15 has a head 18 at one end, which is received in the socket 17, and a second head 19 at the opposite end. The heads 16 and 19 are seated in sockets 20 and 21 in the yokes 13, in which they are free to pivot, while the head 18 of the rod 15 is seated in the socket 17 of the rod 14. The rod 15 has a radially enlarged portion 22, which has a partially spherical shape, adjacent the head 18. The diameter of the portion 22 which has a diameter that is substantially equal to the interior diameter of the torque coupler 11. The rod 14 has a radially enlarged portion 23, which also has a partially spherical shape, adjacent the socket 17. The diameter of the portion 23 is also substantially equal to the interior diameter of the torque coupler 11.

Figure 4:
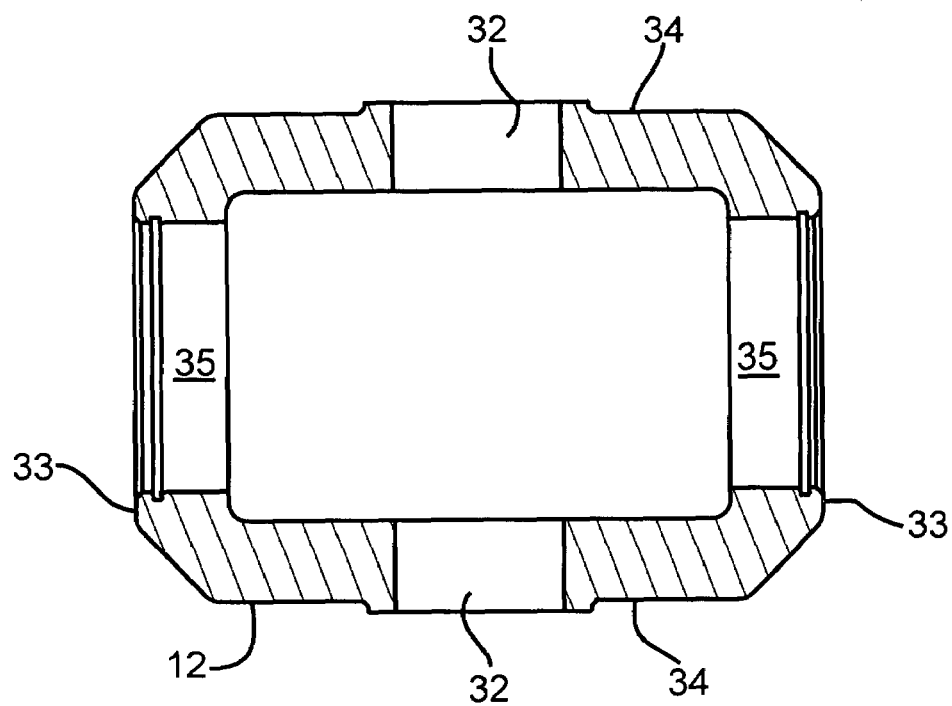
FIG. 4 is a view in horizontal section showing a collar which is a part of the universal joint of FIG. 1.
Figure 5:
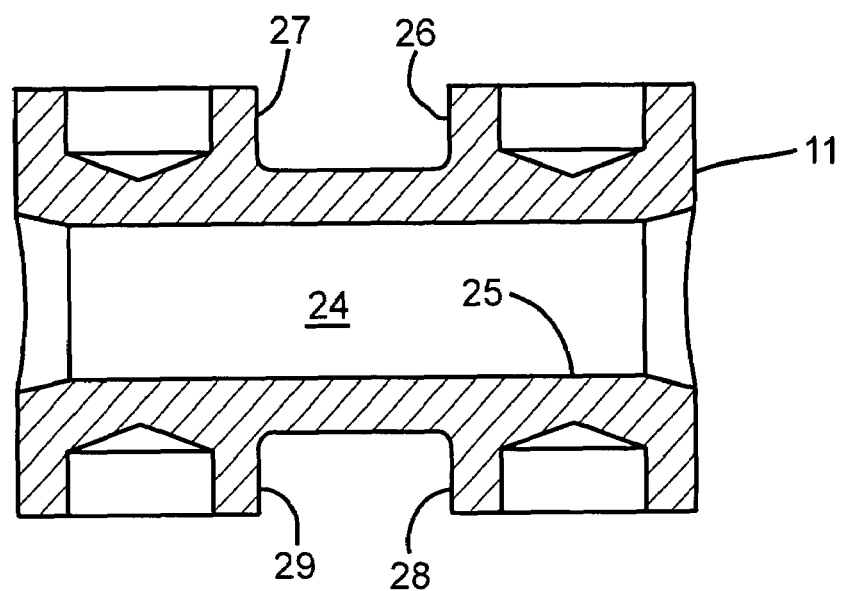
FIG. 5 is a vertical sectional view showing a torque coupler which is a part of the universal joint of FIG. 1.
Figure 6:
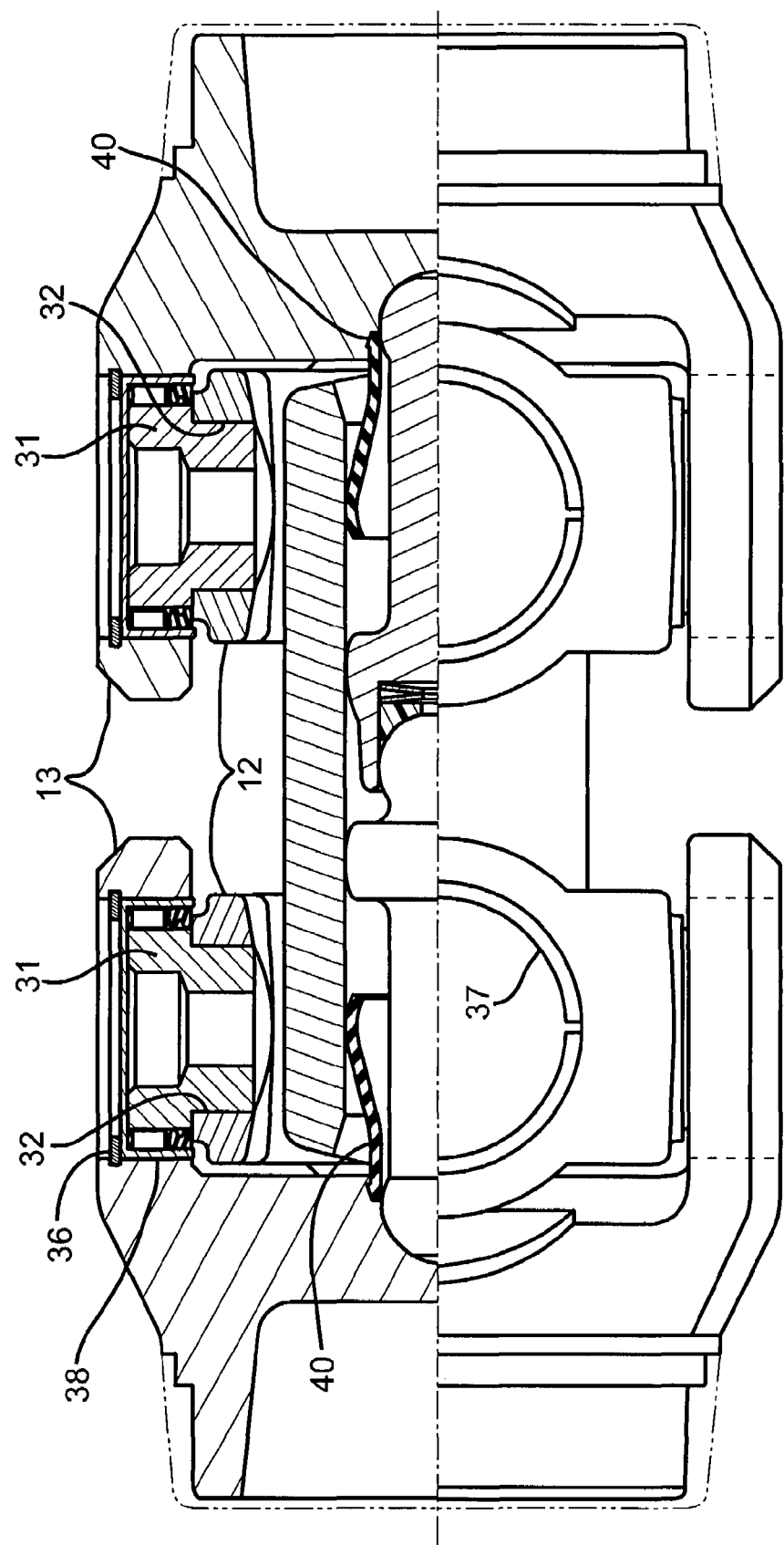
FIG. 6 is a view partly in elevation and partly in vertical section showing the universal joint of FIG. 1 including the torque coupler, yokes and collars which are parts of the universal joint.
Figure 7:
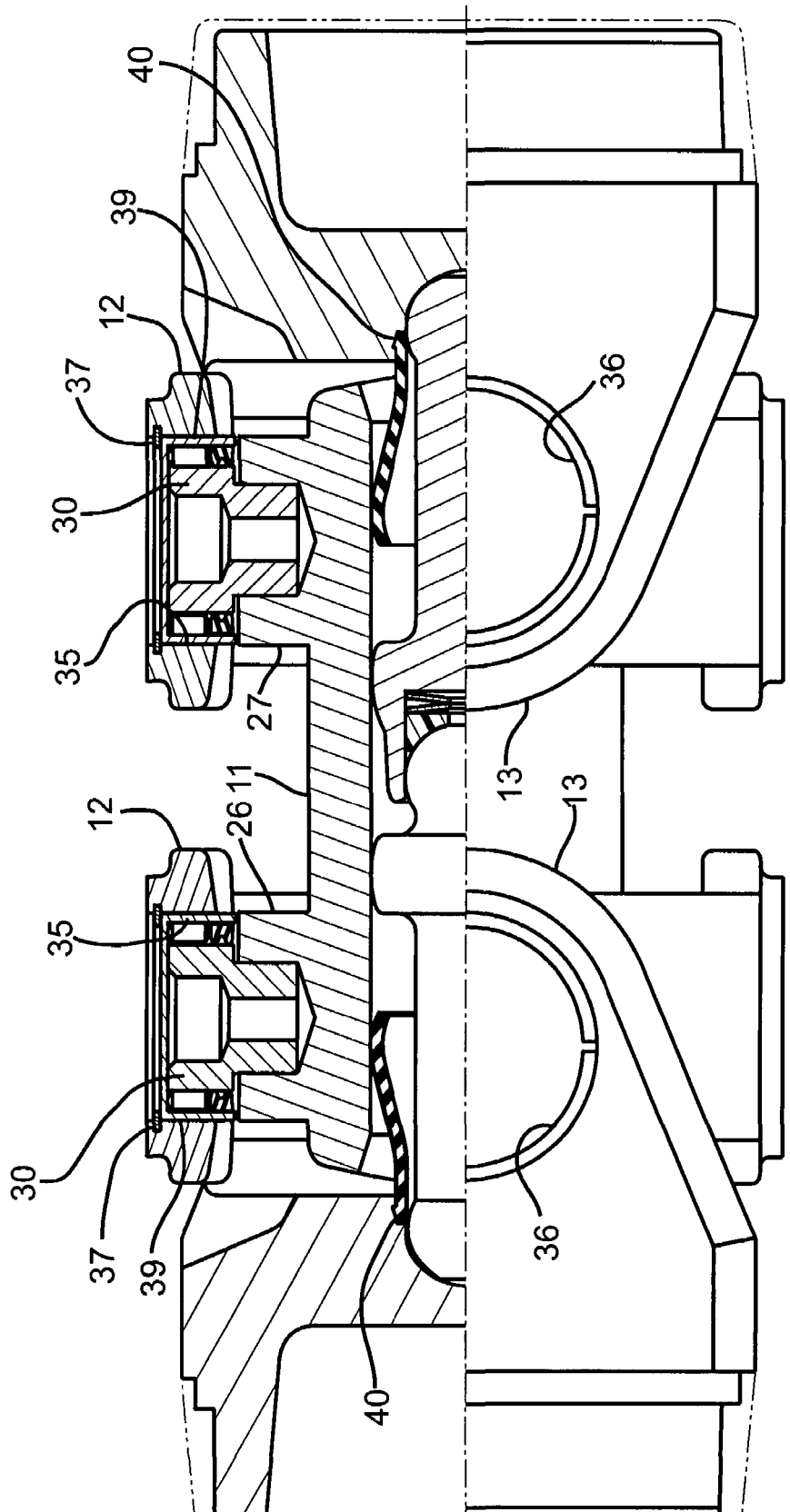
FIG. 7 is partly a plan view and partly a view in horizontal section showing further details of the universal joint of FIG. 1 and of the torque coupler, the yokes and the collars which are shown in FIG. 6.

The torque coupler 11, referring to FIG. 5, has a central bore 24 which is defined by a cylindrical surface 25. The torque coupler 11 includes circumferentially aligned bosses 26 and 27, a boss 28 that is diametrically opposite the boss 26, and a boss 29 that is diametrically opposite the boss 27. In the assembled joint 10 (see FIG. 7), the collars 12 are pivotally attached to the torque coupler 11, adjacent its ends, by trunion pins 30 which are received in the bosses 26 and 28 (the latter is not shown in FIG. 7) and in the bosses 27 and 29 (the latter is not shown in FIG. 7). The collars 12 are also pivotally attached (see FIGS. 2, 3 and 6) to the yokes 13 by trunion pins 31 which are received in openings 32 (see FIG. 4, also) in the collars 12. As a consequence, the two yokes 13 of the universal joint 10 are drivingly coupled together so that when one of the yokes 13 is driven by the driving shaft, the other yoke 13 drives the driven shaft.

Also, when the operating angle between two shafts and their yokes 13 are anything other than zero, for example, as shown in FIG. 3, the head 16 in the socket 20 and the head 19 in the socket 21 are rotated to the positions shown in FIG. 3, and co-action between the radially enlarged portions 22 and 23, on the one hand, and the cylindrical surface 25 of the coupler 11, on the other hand, cause the torque coupler 11 to be positioned, as shown, where it splits the operating angle. In other words, the axis of the torque coupler 11 forms an angle with the axis of the driving shaft that is equal to the angle that it forms with the axis of the driven shaft.

Referring, again, to FIG. 4, the collars 12 have ends 33 and sidewalls 34 in which the openings 32 to which reference is made above, are located. There are also aligned openings 35 in the ends 33 which receive the trunion pins 30 that extend into the coupler bosses 27 and 29, and the coupler bosses 26 and 28, to pivotally connect the collars 11 to the torque coupler 11. The torque coupler 11 actually extends through the collars 12 and the trunion pins 30 permit limited pivotal movement between the collars 12 and the coupler 11. As illustrated in the drawings, the joint 10 may be dimensioned so that the trunion pins 30 are approximately the same distance from the axis of the torque coupler 11 as are the trunion pins 31. This is achieved when the ends 33 are spaced apart a distance that is about the same as the yoke spacing. The outer ends of the trunion pins 31 are restrained from moving outwardly by split rings 36 (FIGS. 2, 3 and 6) carried in the yokes 13 although other retainers may certainly be used. Similarly, the outer ends of the trunion pins 30 are restrained from moving outwardly by split rings 37 (FIG. 7) carried in the collars 12. Other retainers may be employed. Bearings 38 are provided to reduce friction between the trunion pins 31 and the yokes 13 and bearings 39 are provided to reduce friction between the trunion pins 30 and the collars 12.

Resilient or flexible seals 40 are provided to retain lubricant in the interior of the torque coupler bore 24 to promote lubrication of the rods 14 and 15. The seals 40 engage and seal against the yokes 13, at one end, and engage and seal against the cylindrical surface 25 of the coupler 11 at their other end. The seals 40 are operable to keep a lubricant contained in the vicinity of the rods 14 and 15, inside of the coupler 11.

In use, the yokes 13 of the universal joint 10 engage, and are axially aligned with, two shafts (not shown in the drawings). One of the shafts is a driving shaft, and the other is a driven shaft. Both of the shafts rotate. The driving shaft drivingly rotates one of the yokes 13, and the other of the yokes 13 drivingly rotates the driven shaft with torque transmitted through the joint 10. The joint 10 is shown in FIG. 2 with its parts positioned as they would be when the joint connects two axially aligned shafts with an operating angle of zero. In FIG. 3, the joint 10 is shown with its parts positioned to reflect the positions they would assume when the shafts that are connected by the joint 10 have a positive operating angle, i.e., the shafts (not shown) are not axially aligned.

It will be appreciated that various changes and modifications can be made from the specific details of the structure that have been described without departing from the spirit and scope of the invention as set forth in the attached claims and that, in one aspect, the invention is a universal joint comprising a torque coupler having an open interior, a pair of collars, a pair of yokes, and a pair of torque coupler centering rods positioned in a bore in the torque coupler.

I claim:

1. A universal joint comprising
   a torque coupler having an interior bore and a pair of bosses adjacent each end,
   a pair of collars having ends and side walls,
   a pair of yokes having a given yoke spacing, and
   a centering rod assembly in the bore of said coupler,
   wherein said collars are positioned around the ends of said torque coupler and said ends of said collars are pivotally connected to said torque coupler at said bosses,
   wherein said yokes are positioned outside of said side walls of said collars and said yokes are pivotally connected to said collars at said side walls and
   wherein said centering rod assembly is operable, when the operating angle of the joint is not zero, to position said torque coupler so that it splits the operating angle of the universal joint.

2. The universal joint claimed in claim 1 wherein said centering rod assembly is composed of first and second rods, each of which has a first end that is pivotally supported in one or the other of said yokes, wherein said first rod has second end with a socket, wherein said second rod has a headed end that is pivotally received in the socket in said first rod and wherein said first and second rods have radially enlarged portions that cooperate with the torque coupler to position it so that it splits the operating angle of the universal joint.

3. The universal joint claimed in claim 1 wherein the yoke spacing of said yokes is substantially the same as the distance between said ends of said collars.

4. The universal joint claimed in claim 1 wherein said torque coupler has a central axis, wherein the pivotal connection between said collars and said torque coupler includes a first set of trunion pins, wherein the pivotal connection between said yokes and said collars includes a second set of trunion pins and wherein at least a portion of each of said first set of trunion pins is positioned the same distance from the torque coupler axis.

5. The universal joint claimed in claim 4 wherein each of said first and second sets of trunion pins are substantially the same distance from the axis of said torque coupler.

* * * * *